(12) United States Patent
Bradbum (10) Patent No.: US 7,422,233 B2
(45) Date of Patent: Sep. 9, 2008

(54) AIR-BAG

(75) Inventor: Alan Bradbum, Stoke on Trent (GB)

(73) Assignee: Autoliv Development AB, Vargarda (SE)

( * ) Notice: Subject to any disclaimer, the term of this patent is extended or adjusted under 35 U.S.C. 154(b) by 68 days.

(21) Appl. No.: 10/528,163

(22) PCT Filed: Oct. 1, 2003

(86) PCT No.: PCT/SE03/01521

§ 371 (c)(1),
(2), (4) Date: Oct. 26, 2005

(87) PCT Pub. No.: WO2004/031000

PCT Pub. Date: Apr. 15, 2004

(65) Prior Publication Data

US 2006/0108776 A1    May 25, 2006

(30) Foreign Application Priority Data

Oct. 1, 2002    (GB)    .................... 0222732.0

(51) Int. Cl.
*B60R 21/21* (2006.01)
*B60R 21/213* (2006.01)
(52) U.S. Cl. .................. 280/730.2; 280/743.1
(58) Field of Classification Search ........... 280/729, 280/730.2, 743.1
See application file for complete search history.

(56) References Cited

U.S. PATENT DOCUMENTS

| 5,529,334 | A | * | 6/1996 | Meduvsky et al. | ........... 280/738 |
| 5,634,659 | A | * | 6/1997 | Abraham | ................... 280/739 |
| 5,951,038 | A | | 9/1999 | Taguchi et al. | |
| 6,073,961 | A | * | 6/2000 | Bailey et al. | ............. 280/730.2 |
| 6,199,898 | B1 | | 3/2001 | Masuda et al. | |
| 6,203,058 | B1 | | 3/2001 | Elqadah et al. | |
| 6,227,561 | B1 | | 5/2001 | Jost et al. | |
| 6,231,073 | B1 | | 5/2001 | White, Jr. | |
| 6,237,941 | B1 | | 5/2001 | Bailey et al. | |
| 6,273,456 | B1 | | 8/2001 | Heigl | |
| 6,293,581 | B1 | | 9/2001 | Saita et al. | |
| 6,299,199 | B1 | | 10/2001 | Bowers et al. | |
| 6,336,654 | B1 | | 1/2002 | Stein et al. | |

(Continued)

FOREIGN PATENT DOCUMENTS

DE    198 07 572 A1    8/1999

(Continued)

*Primary Examiner*—Christopher Ellis
*Assistant Examiner*—Joseph Rocca
(74) *Attorney, Agent, or Firm*—Brinks Hofer Gilson & Lione (57) ABSTRACT

An air-bag (10) is disclosed which defines at least one inflatable region (14). The air-bag (10) is provided with a gas supply duct (22) which extends into the air-bag (10). The gas supply duct (22) is formed of fabric and is provided with at least one outlet aperture (24) therein through which gas may flow into the said at least one inflatable region (14) of the air-bag (10). The outlet aperture (24) is provided with a reinforcement to reinforce the periphery of the aperture (24) in order to prevent undesirable fraying of the fabric around the periphery of the aperture (24), or undesirable deformation characteristics of the fabric around the periphery of the aperture (24), as the air-bag (10) is inflated.

9 Claims, 6 Drawing Sheets

U.S. PATENT DOCUMENTS

| | | | |
|---|---|---|---|
| 6,409,211 B1 | 6/2002 | Sheng et al. | |
| 6,428,037 B1 | 8/2002 | Bakhsh et al. | |
| 6,431,587 B1 | 8/2002 | O'Docherty | |
| 6,450,529 B1 | 9/2002 | Kalandek et al. | |
| 6,464,250 B1 | 10/2002 | Faigle et al. | |
| 6,530,595 B2 * | 3/2003 | Masuda et al. | 280/730.2 |
| 6,554,314 B1 * | 4/2003 | Uchiyama et al. | 280/730.2 |
| 6,846,010 B2 * | 1/2005 | Enders | 280/730.2 |
| 6,860,506 B2 * | 3/2005 | Ogata et al. | 280/730.2 |
| 6,902,187 B2 * | 6/2005 | Sonnenberg | 280/730.2 |
| 7,032,622 B2 * | 4/2006 | Kitamura et al. | 138/126 |
| 2001/0019201 A1 | 9/2001 | Masuda et al. | |
| 2001/0045729 A1 * | 11/2001 | Mueller | 280/730.2 |
| 2002/0014762 A1 | 2/2002 | Bakhsh et al. | |
| 2002/0020991 A1 | 2/2002 | Tanase et al. | |
| 2002/0036395 A1 | 3/2002 | Bakhsh et al. | |
| 2002/0036396 A1 | 3/2002 | Fischer | |
| 2002/0056974 A1 | 5/2002 | Webert | |
| 2002/0067034 A1 * | 6/2002 | Keshavaraj | 280/743.1 |
| 2002/0105173 A1 | 8/2002 | Saderholm et al. | |
| 2002/0125693 A1 | 9/2002 | Alsup et al. | |
| 2002/0163167 A1 | 11/2002 | Hill | |
| 2002/0175502 A1 | 11/2002 | Tesch et al. | |
| 2002/0195804 A1 | 12/2002 | Hess et al. | |

FOREIGN PATENT DOCUMENTS

| | | |
|---|---|---|
| DE | 199 39 618 A1 | 5/2000 |
| DE | 100 21 576 A1 | 11/2000 |
| DE | 200 16 717 U1 | 3/2001 |
| EP | 0 832 795 A1 | 4/1998 |
| EP | 0 955 215 A2 | 11/1999 |
| EP | 1 205 362 A2 | 5/2002 |
| EP | 1 228 930 A2 | 8/2002 |
| EP | 1 238 865 | 9/2002 |
| EP | 1 238 865 A2 | 9/2002 |
| GB | 2 314 300 | 12/1997 |
| GB | 2 357 467 | 6/2001 |
| JP | 11-321536 | 11/1999 |
| JP | 2001-328503 | 11/2001 |
| JP | 2002200959 | 7/2002 |
| JP | 2002200959 A * | 7/2002 |
| WO | WO 99/42333 | 8/1999 |
| WO | WO 03/018372 | 3/2003 |
| WO | WO 03/051679 | 6/2003 |
| WO | WO 03/051680 | 6/2003 |
| WO | WO 03/078214 | 9/2003 |
| WO | WO 2004/000609 | 12/2003 |
| WO | WO 2004/007250 | 1/2004 |

* cited by examiner

AIR-BAG

CROSS REFERENCE TO RELATED APPLICATION

This application claims priority to PCT/SE2003/001521, filed Oct. 1, 2003 and GB 0222732.0, filed Oct. 1, 2002.

FIELD OF THE INVENTION

The present invention relates to an air-bag, and more particularly relates to an air-bag of the type in which an inner gas supply tube is provided within the air-bag, the gas supply tube being adapted to be connected to a gas generator, and having apertures formed in the wall thereof to direct gas into discrete inflatable regions or chambers formed within the air-bag.

BACKGROUND OF THE INVENTION

It has been proposed to provide an air-bag which has a plurality of inflatable regions or chambers which are to be supplied with gas from a gas generator. One example of such an air-bag is a so-called "inflatable curtain" which is adapted to be mounted in the roof of the vehicle above the door openings of the vehicle, and is also adapted, when an accident occurs, to be deployed to lie adjacent the window openings formed in the door, thus forming a protective curtain located between the occupant of the vehicle and the side of the vehicle. Such inflatable curtains provide protection to the occupant of the vehicle in the event of a side impact or roll-over situation.

U.S. Pat. No. 6,199,898 B discloses a safety device of this type in which the inflatable curtain is formed of an inflatable element which is divided into a plurality of regions or chambers which are to be inflated. An internal fabric gas supply duct is provided. That gas supply duct is provided, along its length, with circular apertures formed in the wall of the duct through which gas can flow from the duct into those regions or chambers of the inflatable element which are to be inflated.

It is conventional for the main fabric parts of the air-bag, and also the internal gas supply duct, to be cut-out from a large sheet or roll of fabric in such a way that maximum use is made of the fabric so that there is minimum wastage. The internal fabric gas supply duct is normally formed by taking an elongate strip of fabric and folding it so that the opposed edges are brought together, those opposed edges being inserted between the adjacent edges of the layers of fabric which form the main part of the inflatable curtain. The four super-imposed edges are stitched together.

Depending upon the cutting-out pattern used for cutting the main fabric parts of the air-bag and the supply duct from the sheet or roll of fabric, the axis of the gas supply duct may effectively make any angle with the warp and weft yarns of the fabric. The axis of the fabric element forming the gas supply duct may, for example, be aligned with either the warp yarns or the weft yarns. In such a case it has been found that the textile "tube" that constitutes the gas supply duct may be almost non-flexible in a radial direction. Consequently the edges of the circular apertures formed in the gas supply duct may "tear" during the inflation process. This may cause an irregular deployment of the inflatable curtain.

If the axis of the element that forms the gas supply duct is such that the warp and weft yarns each make an angle of, say, 45° to the axis, the resultant "tube" may be quite flexible in the radial direction. However, during inflation, the region of fabric around the outlets may deform or may become very substantially "frayed" or with some of the fibres forming the fabric extending into the regions or chambers which are to be inflated. If the internal gas supply duct is not located in exactly the correct position within the inflatable curtain, this deformation of the region around the apertures may be blocked, for example by the dividing seam between two adjacent regions or chambers. Again, in this case, the deployment of the inflatable curtain may be irregular.

The present invention seeks to provide an improved air-bag.

SUMMARY OF THE INVENTION

According to the present invention, there is provided an air-bag, the air-bag defining at least one inflatable region, the air-bag being provided with a gas supply duct extending into the air-bag, the gas supply duct being formed of a flexible material and being provided with at least one aperture therein through which gas may flow into the inflatable regions of the air-bag, the aperture being provided with a reinforcement reinforcing the periphery of the aperture. Conveniently the flexible material comprises fabric or a plastic material. Alternatively, the flexible material comprises foil. Preferably the gas supply duct is of an elongate form.

Advantageously the gas supply duct is provided with a plurality of apertures, each aperture being associated with a reinforcement. Conveniently one or more of the apertures are provided with a respective reinforcement. Preferably the reinforcement is stitching provided in the flexible material forming the gas supply duct. Conveniently the reinforcement comprises a length of thread extending across the respective aperture so as to tie together opposing parts of the aperture. Advantageously the reinforcement for the aperture is a respective annular reinforcing element. Conveniently the reinforcement is a single reinforcing element defining a plurality of apertures. Preferably the reinforcing element is adhered to the flexible material. Advantageously the reinforcing element is formed of fabric.

Conveniently the reinforcing element is a region of adhesive which also bonds parts of the flexible material together to form the gas supply duct. Preferably the aperture takes the form of a slit through the flexible material and the adhesive.

Conveniently the air-bag defines a plurality of inflatable regions or chambers. Preferably the air-bag is an inflatable curtain, the gas supply duct being positioned to supply gas to each of the inflatable regions or chambers.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
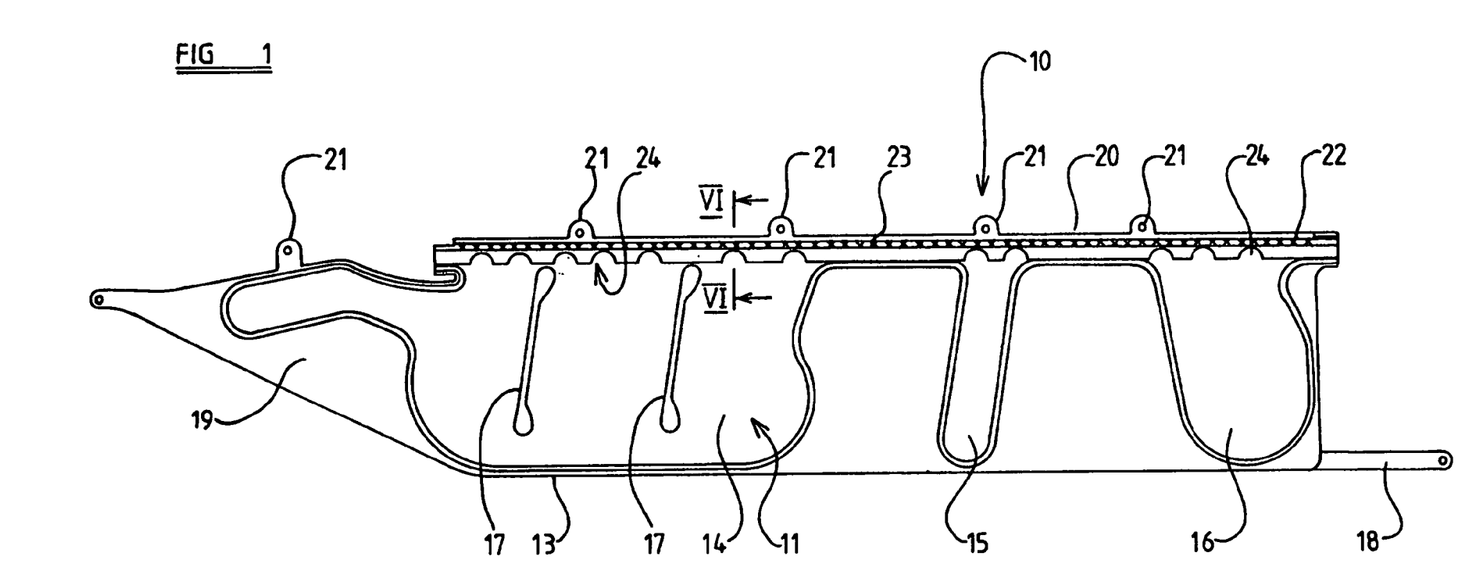
FIG. 1 is a diagrammatic side view of an air-bag in accordance with the invention without illustrating the reinforcement.
Figure 2:
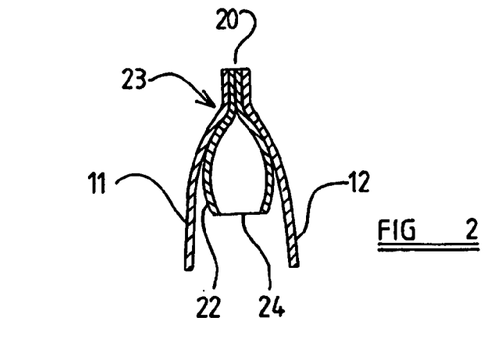
FIG. 2 is a sectional view taken on the line II-II of FIG. 1, showing the air-bag in an inflated condition.
Figures 3, 3A, 3B:
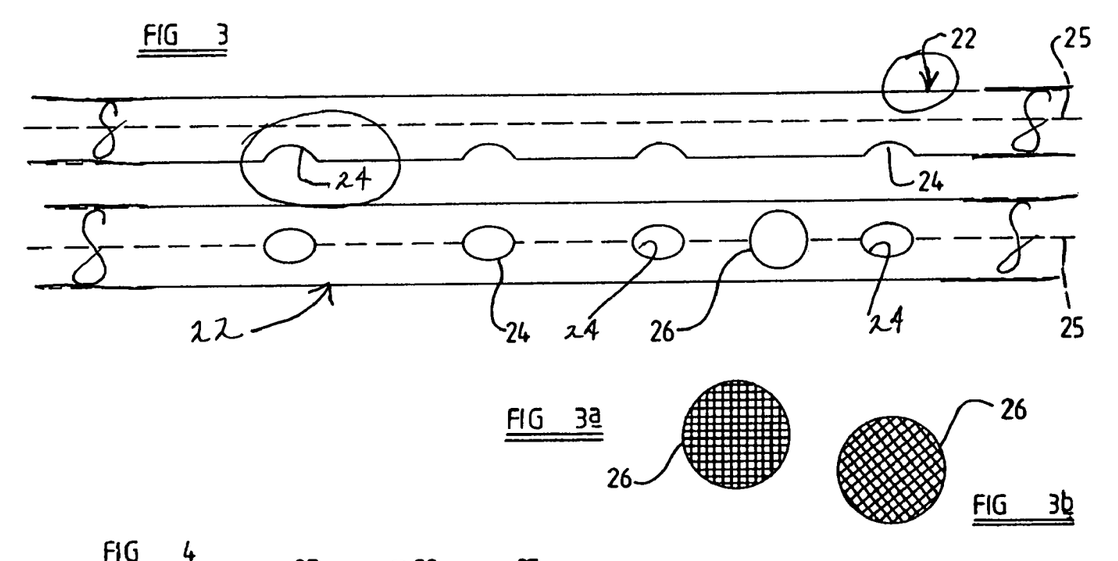
FIG. 3 is a side view and an underneath view of the gas supply duct of the air-bag of FIG. 1, again without showing the reinforcement.
FIG. 3a is an enlarged view of part of the gas duct of FIG. 3 illustrating the yarn orientation in one embodiment of the invention.
FIG. 3b is a view corresponding to FIG. 3a illustrating the yarn orientation in an alternative embodiment of the invention.

Turning initially to FIGS. 1 to 3, an air-bag in accordance with the present invention is illustrated in the form of a so-called inflatable curtain 10. The inflatable curtain 10 is formed from two super-imposed layers of fabric 11 and 12 of similar outer shape. The layers of fabric 11 and 12 are interconnected by means of seams 13 which define inflatable regions 14, 15, and 16. One of these inflatable regions 14 is sub-divided into inflatable chambers by means of seams 17 which interconnect the layers of fabric 11 and 12 within inflatable region 14.

The present invention is not limited to the use of fabric, and the super-imposed layers 11 and 12 may be formed from another suitable flexible material, for example plastic foil.

At one end of the lower edge of the inflatable curtain 10, as shown in FIG. 1, a protruding strap 18 is provided, the strap 18 being adapted to be connected to an anchoring point in a vehicle. At the other end of the lower edge the inflatable curtain 10 a generally triangular extension 19 is provided which is also adapted to be connected to an anchoring point within the vehicle. The upper edge 20 of the inflatable curtain 10 is provided with a plurality of apertured mounting lugs 21 by means of which the inflatable curtain 10 may be mounted in position within a motor vehicle.

Extending adjacent the upper edge 20 of the inflatable curtain 10 there is provided an internal gas supply duct 22 of elongate form. The gas supply duct 22 is formed from a single element of fabric of elongate form which is folded about its axis so that the opposed side edges thereof are substantially super-imposed. The side edges of the fabric of the gas supply duct are inserted between the super-imposed upper side edges of the fabric layers 11 and 12 of the inflatable curtain 10, and the four super-imposed edges are interconnected by stitching 23 (see FIG. 2). The lower-most part of the gas-supply duct 22 is provided with apertures 24 which are provided in those parts of the gas-supply duct which extend across the inflatable regions 14, 15, and 16 of the inflatable curtain 10.

In use of the inflatable curtain 10, gas is supplied through the gas-supply duct 22 which becomes inflated, and the gas passes through the apertures 24 formed in the gas supply duct 22 into the inflatable regions 14, 15, and 16 to cause those regions of the inflatable curtain 10 to inflate.

FIG. 3 illustrates the gas supply duct 22, which is provided with apertures 24, from the side, and from below. As mentioned above, the gas supply duct is of elongate form and therefore defines elongate axis 25.

FIG. 3 illustrates an area 26 of the fabric forming the gas supply duct 22 which is illustrated at an enlarged scale in FIGS. 3a and 3b which show alternate embodiments of the inventions.

Looking initially at FIG. 3a, the warp and weft yarns of the fabric forming the gas supply duct 22 are shown. It can be seen that one set of yarns (i.e. either the warp or weft yarns) are co-aligned with the axis 25 and the other set of yarns are 90° to the axis 25.

FIG. 3b shows an alternative arrangement in which the warp and weft yarns each make an angle of approximately 45° with axis 25.

It is thus to be understood that the yarns forming the fabric that constitutes the gas supply duct 22 may have any orientation with reference to the axis of the gas supply duct 22.

Whilst the gas supply duct 22 described so far is formed from a single element of fabric which is folded and sewn by stitching 23 to form the tubular gas supply duct 22, gas supply ducts for use with the present invention may be formed as totally separate tubes or sleeves which are inserted into a pre-fabricated inflatable curtain.

As has been described above, if the yarns of the fabric are located so that one set of yarns are co-aligned with the axis 25 of the duct 22, the apertures 24 formed in the duct 22 may tear on inflation of the inflatable curtain 10. Alternatively, if the yarns are inclined at 45° to the axis 25 of the duct 22, should the gas supply duct 22 not be correctly positioned, the desired deformation of the fabric surrounding each aperture 24 may be blocked or restricted, for example by a dividing seam between two adjacent inflatable regions or chambers.

In embodiments of the present invention the fabric around at least one and preferably all of the gas outlet apertures 24 of the gas supply 22 are provided with a reinforcement to prevent tearing or deformation of the fabric surrounding the aperture.

Figure 4:
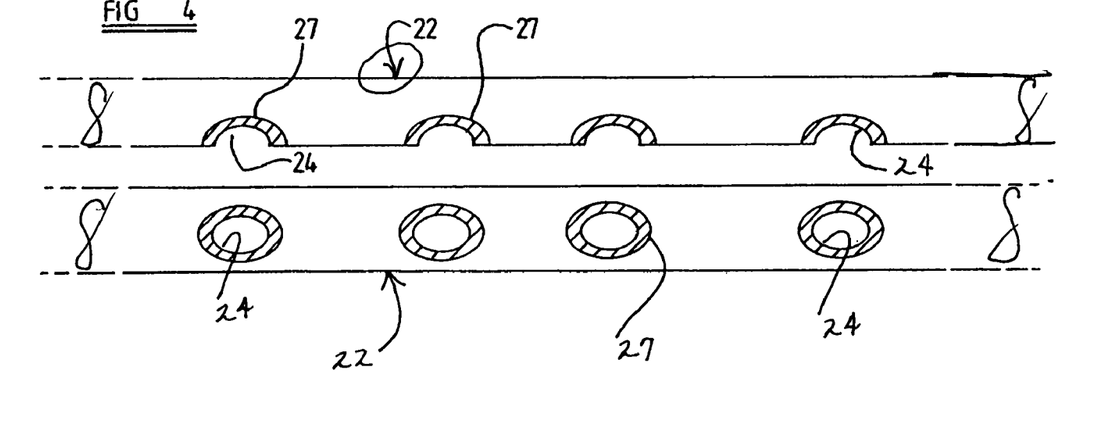
FIG. 4 is a view corresponding to FIG. 3 showing one embodiment of a gas supply duct with reinforcement.

FIG. 4 illustrates an arrangement in which each aperture 24 within the gas supply duct 22 is provided with an annular reinforcing element 27 which is secured in position such that the central aperture of each annular element 27 is co-aligned with the respective aperture 24 formed in the fabric constituting the gas supply duct 22. Each annular element 27 may be mounted in position, for example, by the use of an adhesive, but may be secured in position using other techniques such as sonic welding.

Figure 5:
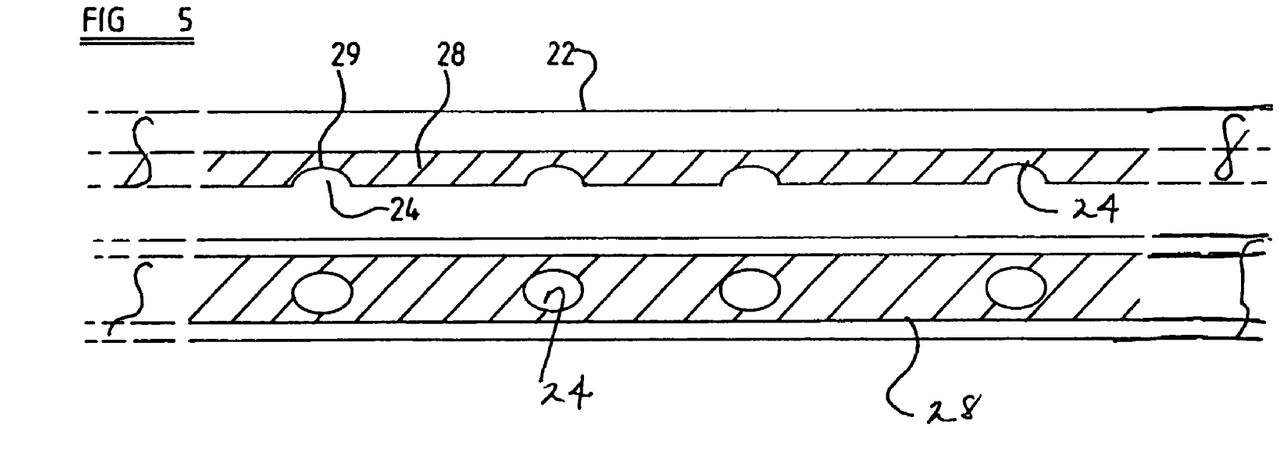
FIG. 5 is a view corresponding to FIG. 4 showing an alternative form of gas supply duct with reinforcement.

FIG. 5 illustrates a further embodiment of the invention wherein a single elongate reinforcing element 28 is provided, the element 28 having apertures 29 formed therein to be co-aligned with the apertures 24 formed in the fabric constituting the gas supply duct 22. Again the elongate reinforcing element 28 may be secured in position by means of an adhesive or using other techniques such as sonic welding. The reinforcing elements shown in FIGS. 4 and 5 may be of fabric or other suitable material.

Figure 6:
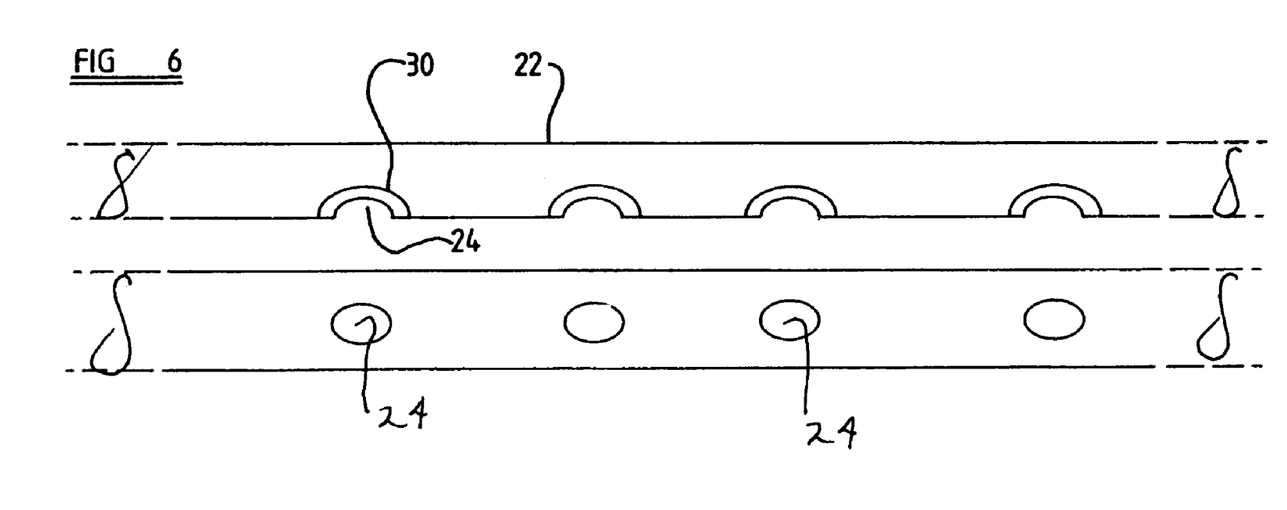
FIG. 6 is a further view corresponding to FIG. 4 showing yet another form of gas supply duct with reinforcement.

FIG. 6 illustrates a further embodiment of the invention wherein each aperture 24 in the gas supply duct 22 is provided with stitching 30 around its outer periphery, the stitching constituting the reinforcement.

In each of the arrangements shown in FIGS. 4, 5 and 6 each aperture 24 provided within the gas supply duct 22 is provided with a reinforcement which reinforces the periphery of the aperture, thereby helping to prevent deformation or unwanted fraying of fabric in the region of the apertures during deployment of the air-bag.

Figure 7A:
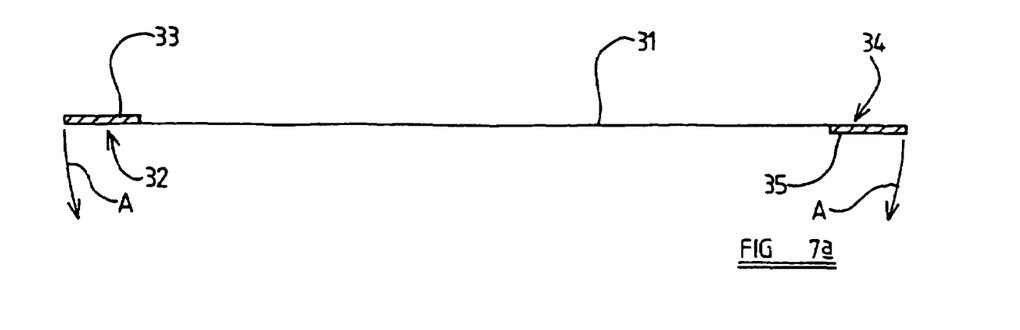
FIG. 7 is an end view of a gas supply duct in accordance with another embodiment of the present invention, illustrating successive stages during manufacture.
Figure 7B:
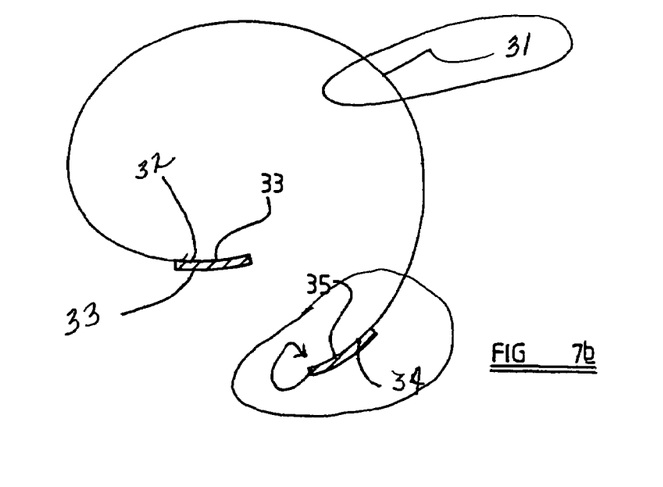
Figure 7C:
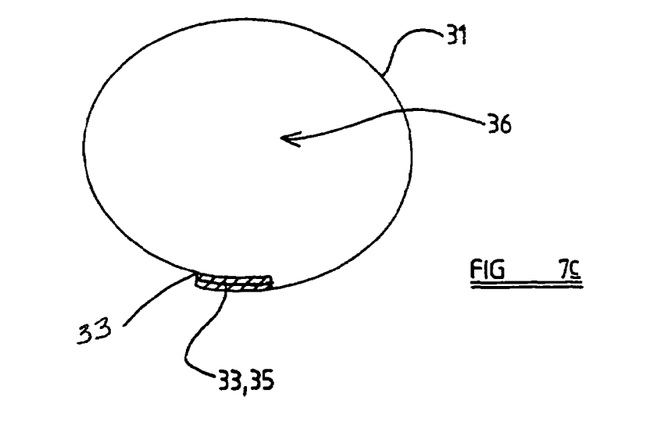

FIGS. 7a, 7b, and 7c illustrate three stages during the fabrication of an alternative form of gas supply duct in accordance with the present invention. Referring initially to FIG. 7a, there is illustrated, from one end, an elongate, substantially rectangular, sheet of foil or the like 31. Along one longitudinal edge 32 of the foil 31, there is provided, on the upper surface of the foil, a region of adhesive 33. Along the opposing longitudinal edge 34 of the foil 31, another region of adhesive 35 is provided, but this region is provided on the under-surface of the foil 31, in the orientation illustrated in FIG. 7a.

It will therefore be seen, having particular regard to FIG. 7b, that the elongate piece of foil 31 can be rolled such that the two longitudinal edge regions of the foil 32 and 34 are superimposed on one another. As illustrated in FIG. 7c, the two regions 33 and 35 of adhesive are stuck to one another and hold the length of foil 31 in a substantially cylindrical, tubular configuration to define the resulting gas supply duct 36.

Figure 8:
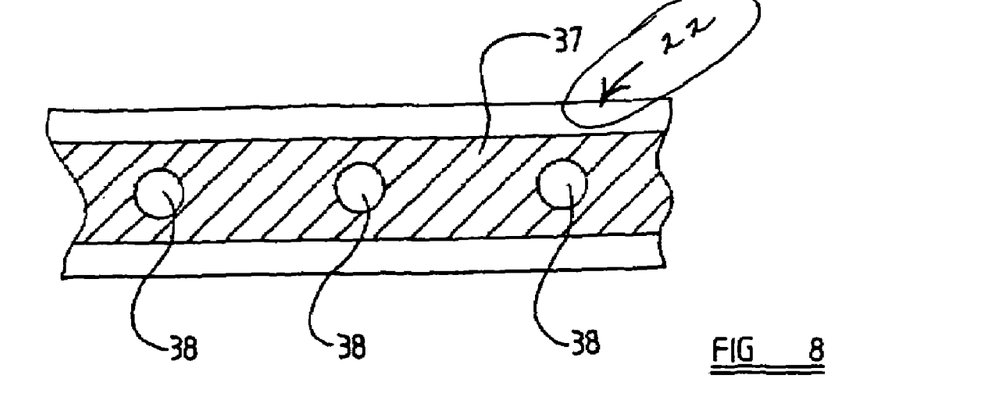
FIG. 8 is an underneath view of the gas supply duct illustrated in FIG. 7, showing a plurality of apertures therein.

FIG. 8 illustrates the resulting gas supply duct 36 from below, and the rectangular shaded area 37 represents the adhesive 33 and 35 which holds the gas supply duct 36 together in the manner illustrated in FIG. 7c. It will seen that a plurality of substantially equi-spaced apertures 38 are then cut through the two superimposed edge regions of the foil 31 and through the adhesive lying therebetween. The region of adhesive area 37, when fully or substantially cured, serves as the reinforcement of the duct 36, thereby preventing substantial deflection of a foil material 31 in the region of the apertures 38, and also preventing damage to the edges of the apertures 38 themselves.

Figure 9:
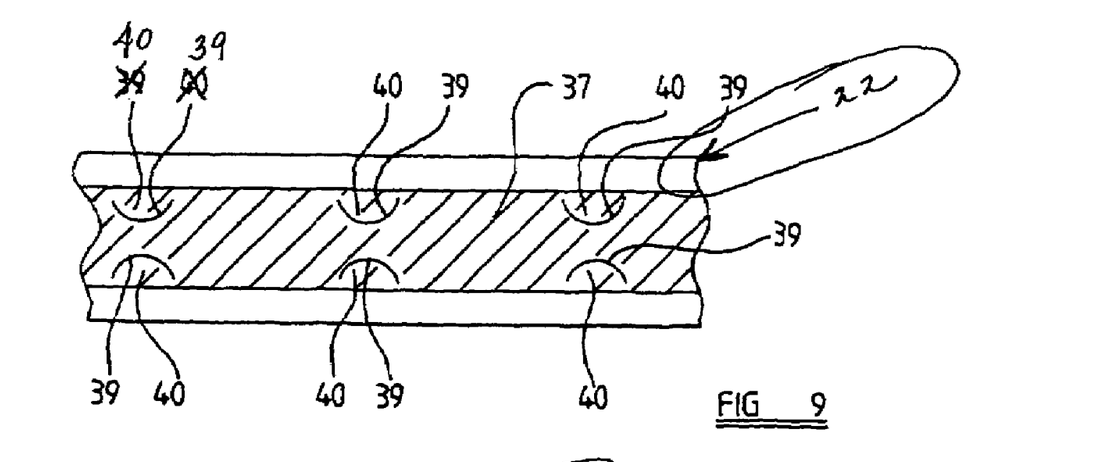
FIG. 9 is a view corresponding generally to that of FIG. 8, but illustrating an alternative embodiment, in which the gas supply gas duct is provided with a plurality of slits therethrough.

FIG. 9 illustrates a variant of the arrangement illustrated in FIG. 8, in which, instead of providing a plurality of equi-spaced apertures in the form of substantially circular holes, the apertures which are cut through the superimposed edge regions of the foil material 31 and the adhesive 37, instead take the form of generally arcuate, narrow slits 39. The slits 39 are arranged in opposing pairs.

Because of the arcuate configuration of each slit 39, each slit defines a small outlet flap 40 which, in the condition illustrated in FIG. 9, are substantially closed.

Figure 10:
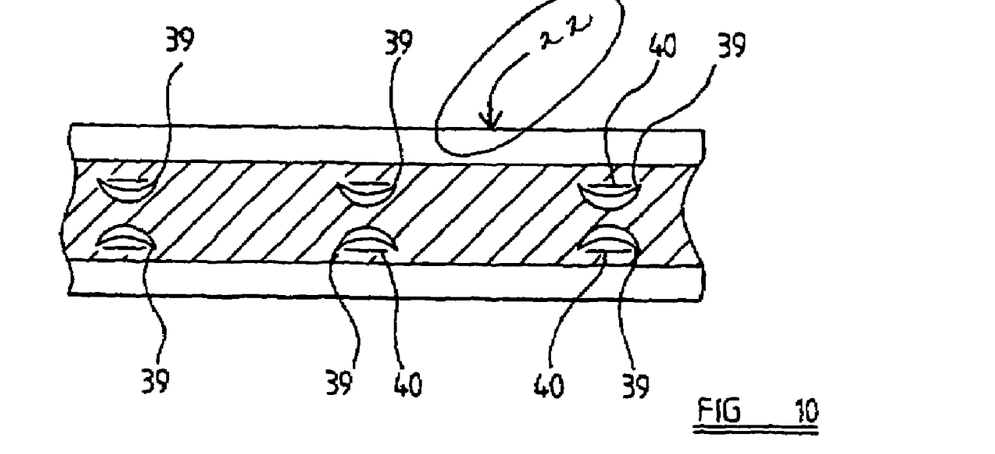
FIG. 10 is a view corresponding generally to that of FIG. 9, but illustrating the slits in a slightly opened condition representative of their condition upon inflation of the air-bag.

FIG. 10 illustrates the arrangement shown in FIG. 9 in the condition it adopts during inflation of the air-bag. It will be seen that each flap 40 is caused to open slightly under the action of the gas from the gas generator being forced through the slits 39.

The arrangement illustrated in FIGS. 9 and 10 is considered to be advantageous when compared to the arrangement of FIG. 8 because by cutting a plurality of slits through the foil material 31 and the adhesive 37, there is no, or at least significantly reduced, waste material when compared to the step of cutting out the circular apertures 38 in the FIG. 8 embodiment. This means that manufacture of the arrangement illustrated in FIG. 9 can more easily be automated than that of FIG. 8, because there is less risk of waste material such as cut-out pieces of foil, block or jamming machinery.

Another advantage of the arrangement illustrated in FIGS. 9 and 10 is that, by careful orientation of the slits 39, the flaps 40 can be configured to protect regions of the inflatable curtain fabric lying immediately adjacent the gas supply duct, which is particularly advantageous because the gas flow exiting the apertures provided in the gas supply duct can be very aggressive.

Figure 11:
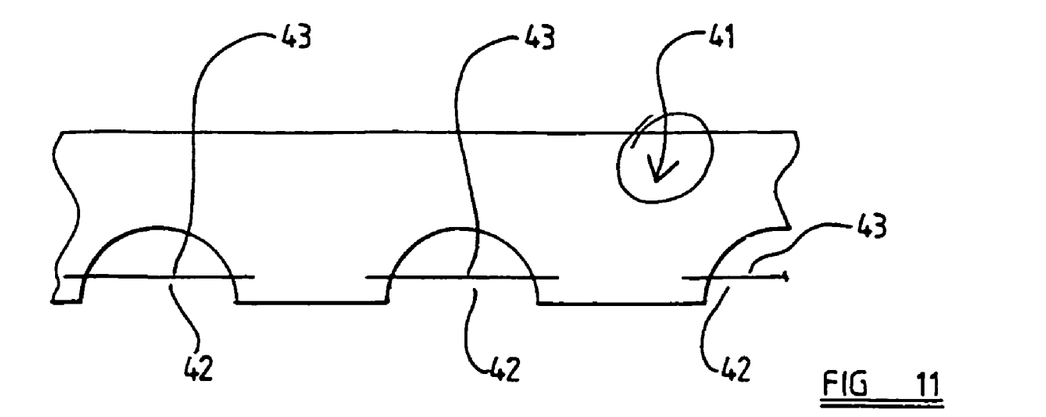
FIG. 11 is a side view of a gas supply duct in accordance with a further embodiment of this present invention.

FIG. 11 illustrates a further proposed configuration for the gas supply duct, viewed from the side. The gas supply duct 41 of this arrangement is again provided with a plurality of substantially circular cut-out apertures 42 along its lower-most region, and it is envisaged that the supply duct 41 of this embodiment will be made from fabric material. The gas supply duct 41 is provided with a plurality of length of stitching 43, each of which is provided in the region of a respective aperture 42. The stitching 43 of each aperture 42 comprises a length of thread which extends from the fabric of the duct adjacent one side of the aperture and extends across the aperture to terminate in the fabric on the opposite side of the aperture 42. It will therefore be seen that each length of thread effectively ties together opposing parts of the aperture 42. This form of stitched reinforcement is mainly intended to avoid substantial deformation of the outlet apertures 42 during deployment of the air-bag, by preventing opposing parts of the apertures from moving away from one another during inflation.

Figure 12:
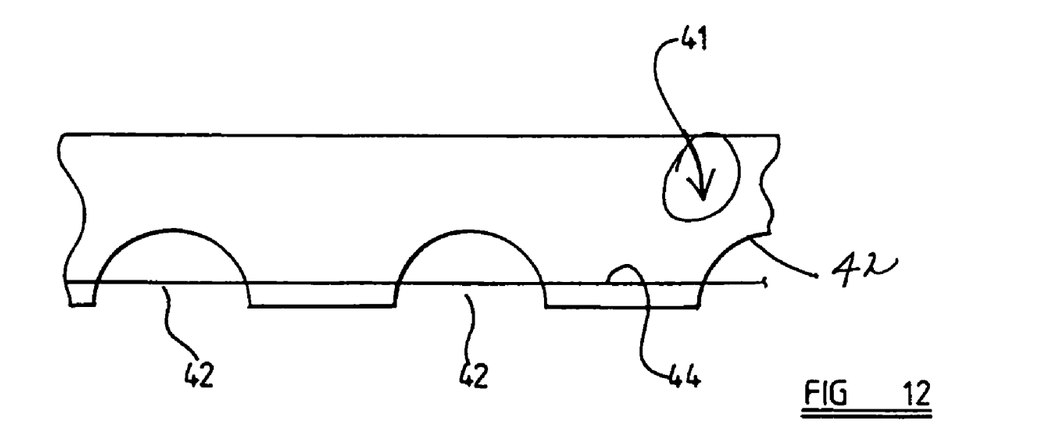
FIG. 12 is a view corresponding generally to that of FIG. 11, illustrating a further variant of the gas supply duct.

FIG. 12 illustrates a variant of the arrangement illustrated in FIG. 11, in which a continuous line of stitching 44 is provided along the length of the gas supply duct 41 in regions between adjacent apertures 42, the thread of the stitching 44 is stitched through the fabric of the gas supply duct as a plurality of stitches, but in the region of each aperture 42, the thread extends across the apertures in substantially the same manner as described above with reference to FIG. 11, again so as to serve to tie together opposing sides of the apertures 42. In this arrangement, it is envisaged that the line of stitching 44 could be used to hold together superimposed edge regions of a piece of fabric defining the gas supply duct 41.

While the above description constitutes the preferred embodiment of the present invention, it will be appreciated that the invention is susceptible to modification, variation and change without departing from the proper scope and fair meaning of the accompanying claims.

The invention claimed is:

1. An air-bag comprising, at least one inflatable region, the air-bag being provided with a gas supply duct extending into the air-bag, the gas supply duct being formed of a flexible material and being provided with at least one aperture therein through which an inflating gas may flow into the at least one inflatable region of the air-bag, the at least one aperture being provided with a reinforcement reinforcing a periphery of the aperture, wherein the reinforcement is in the form of stitching provided in the flexible material forming the gas supply duct and includes a length of thread which is disposed in the aperture and extends across the aperture to tie together opposing parts of the aperture, restraining the opposing parts from moving away from each other during inflation of the airbag.

2. The air-bag according to claim 1 wherein the flexible material comprises fabric or a plastic material.

3. The air-bag according to claim 1 wherein the flexible material comprises foil.

4. The air-bag according to claim 1 wherein the gas supply duct is of an elongate form.

5. An air-bag according to claim 1 wherein the gas supply duct is provided with a plurality of the apertures, each of the apertures being associated with a reinforcement.

6. The air-bag according to claim 1 wherein the air-bag defines a plurality of inflatable regions or chambers.

7. The air-bag according to claim 1 wherein the air-bag is an inflatable curtain, the gas supply duct being positioned to supply gas to each of the inflatable regions or chambers.

8. The air-bag according to claim 1 wherein the gas supply duct is formed of a single layer of the flexible material.

9. The air-bag according to claim 8 wherein the flexible material is fabric.

* * * * *

UNITED STATES PATENT AND TRADEMARK OFFICE
CERTIFICATE OF CORRECTION

| | | |
|---|---|---|
| PATENT NO. | : 7,422,233 B2 | Page 1 of 1 |
| APPLICATION NO. | : 10/528163 | |
| DATED | : September 9, 2008 | |
| INVENTOR(S) | : Alan Bradbum | |

It is certified that error appears in the above-identified patent and that said Letters Patent is hereby corrected as shown below:

Title Page, Item (75)

INVENTOR:

Under Inventor, please delete "Stoke on Trent" and insert --Staffordshire--.

Signed and Sealed this

Twenty-third Day of December, 2008

JON W. DUDAS
*Director of the United States Patent and Trademark Office*